United States Patent
Davis, Sr.

(10) Patent No.: US 8,231,327 B2
(45) Date of Patent: Jul. 31, 2012

(54) RIVER HIGH PRESSURE ENERGY CONVERSION MACHINE

(76) Inventor: Albert Hamilton Davis, Sr., Annandale, VA (US)

( * ) Notice: Subject to any disclaimer, the term of this patent is extended or adjusted under 35 U.S.C. 154(b) by 0 days.

(21) Appl. No.: 13/104,971

(22) Filed: May 10, 2011

(65) Prior Publication Data

US 2011/0204642 A1 Aug. 25, 2011

Related U.S. Application Data

(63) Continuation-in-part of application No. 12/780,925, filed on May 16, 2010, now abandoned.

(51) Int. Cl.
*E02B 9/06* (2006.01)
*F03B 13/00* (2006.01)

(52) U.S. Cl. ......................... 415/3.1; 415/906
(58) Field of Classification Search .............. 415/4.3, 415/906, 202, 75; 290/42, 43, 53, 54
See application file for complete search history.

(56) References Cited

U.S. PATENT DOCUMENTS

| | | | |
|---|---|---|---|
| 2,764,871 A | 10/1956 | Dowling | |
| 3,222,876 A | 12/1965 | Harmstorf | |
| 4,052,856 A | 10/1977 | Trotta | |
| 4,110,980 A | 9/1978 | Foulke | |
| 4,182,123 A | 1/1980 | Ueda | |
| 4,188,788 A | 2/1980 | Eller | |
| 4,284,063 A | 8/1981 | Watson | |
| 4,364,228 A | 12/1982 | Eller | |
| 4,674,279 A | 6/1987 | Ali et al. | |
| 4,746,244 A | 5/1988 | Broome | |
| 4,836,142 A | 6/1989 | Duback | |
| 4,948,985 A | 8/1990 | Adams | |
| 6,000,880 A * | 12/1999 | Halus | 405/52 |
| 6,011,334 A | 1/2000 | Roland | |
| 6,114,773 A | 9/2000 | Kouris | |
| 6,396,162 B1 | 5/2002 | Carrillo | |
| 6,606,857 B1 | 8/2003 | Simonds | |
| 7,084,521 B1 | 8/2006 | Martin | |
| 7,150,149 B2 | 12/2006 | Rochester et al. | |
| 7,357,599 B2 | 4/2008 | Cripps | |
| 7,492,054 B2 | 2/2009 | Catlin | |
| 7,501,712 B2 | 3/2009 | Bolyard | |
| 7,579,703 B2 | 8/2009 | Shifrin | |

(Continued)

FOREIGN PATENT DOCUMENTS

DE 33 33 176 A1 1/1985

(Continued)

*Primary Examiner* — Edward Look
*Assistant Examiner* — Jesse Prager
(74) *Attorney, Agent, or Firm* — Swift & Swift; Stephen Christopher Swift (57) ABSTRACT

A river high pressure energy conversion machine which has no moving parts, comprising a machine (or pump) having a pipe attached to a river bed, with a flexible pipe to an enlarged water inlet attached to the underside of a float, to assure entrance of water just below the river water surface. A discharge pipe from the machine rises above the river bank to a water-driven accessory, through a stop valve and a pressure regulating valve. The discharge pipe from the accessory discharges river water back to the river. Water stacks up inside the sloping machine pipe on the river bed, and creates higher water pressure at the machine pipe outlet for driving the accessory. This is a continuous process, generating electricity twenty-four hours every day, using only gravity as the pressurizing force on water to generate electricity, without using fossil, nuclear or artificial energy forces.

15 Claims, 6 Drawing Sheets

U.S. PATENT DOCUMENTS

| | | |
|---|---|---|
| 7,640,792 B2 | 1/2010 | Watt |
| 2005/0023836 A1 | 2/2005 | Abdalla |
| 2006/0181086 A1 | 8/2006 | Martin |
| 2008/0116689 A1 | 5/2008 | Alstot et al. |
| 2009/0085356 A1 | 4/2009 | Lyatkher |
| 2009/0096214 A1 | 4/2009 | Sternitzke |

FOREIGN PATENT DOCUMENTS

| | | |
|---|---|---|
| JP | 2006-17055 A | 1/2006 |
| JP | 2006-22745 A | 1/2006 |

* cited by examiner

RIVER HIGH PRESSURE ENERGY CONVERSION MACHINE

CROSS REFERENCE TO RELATED APPLICATION

This application is a Continuation-In-Part of U.S. Regular Utility patent application Ser. No. 12/780,925, filed May 16, 2010, which is incorporated herein by reference.

BACKGROUND OF THE INVENTION

1. Field of the Invention

The present invention relates to hydrokinetic energy conversion systems, more particularly river high pressure water pumps that convert river water and gravitational energy in the form of a high pressure water pump, which may be used for various purposes, including generating power, compressing and/or liquefying gaseous fluids, producing potable water or general cleaning thereof, through reverse osmosis membrane processes, irrigation for aqua farms, delivering water from one location to another, etc. Water falls are included as they are a part of rivers.

2. Description of the Prior Art

Current energy demands require much use of shrinking available fossil fuels, nuclear power or other costly manmade substitutes. The demands cannot be met indefinitely without serious impact on the world economy and the environment.

Alternative energy producing methods have been proposed using natural forces such as solar, air, and water. Solar panels or related use of solar energy is widely known. These solar energy conversion systems work well in providing alternative energy, but they still suffer from inefficient use of or conversion from the source. More ever they are a costly investment. Air power via windmills and derivatives thereof is another viable source of energy. However, it requires optimal geographic and weather conditions for these systems to work. Water energy conversion systems utilizing the natural power of river water and gravitation forces are being proposed by this inventor in an effort to use the immense mechanical energy created by gravity as rivers flow from higher elevations to lower elevations using the energy benefits from gravitational forces. All of the above systems are viable alternative energy sources, but widespread use have not been seen due to costs and or efficient use of the natural resources.

Thus, river high pressure water pumps solving the aforementioned problems is desired. River high pressure water pumps include vertical water pumps in waterfalls and water pumps on sloping river beds.

U.S. Pat. No. 4,182,123, issued on Jan. 8, 1980, to Tsuneo Ueda, discloses a hydraulic power plant, in which water is drawn from a reservoir through a penstock that passes over a dam wall, using a siphon effect. The instant invention is distinguishable, in that it draws energy from flowing water in a river or waterfall, and does not use a siphon effect.

U.S. Pat. No. 4,188,788, issued on Feb. 19, 1980, to James D. Eller, discloses a hydraulic turbine system, with a submersible turbine-driven pump, that may capture energy from flowing water, but does not disclose the pipes or tanks to channel the water of the instant invention.

U.S. Pat. No. 4,364,228, issued on Dec. 21, 1982, to J. David Eller, discloses a hydraulic turbine system, with siphon action not used in the instant invention.

U.S. Pat. No. 4,674,279, issued on Jun. 23, 1987, to Mohammad A. Ali et al., discloses a control system for a run-of-river hydroelectric plant, without the use of pipes in the manner of the instant invention.

U.S. Pat. No. 6,011,334, issued on Jan. 4, 2000, to Louis Roland, discloses an in-line fluid-driven electric power generator, which uses energy from fluid moving in a pipe to generate electricity, but unlike the instant invention is not designed to be placed in a river or waterfall.

U.S. Pat. No. 6,114,773, issued on Sep. 5, 2000, to Paul S. Kouris, discloses a hydraulic turbine assembly, using an inlet pump, but designed for use in a dammed reservoir, rather than a river or waterfall, as in the instant invention.

U.S. Pat. No. 7,084,521, issued on Aug. 1, 2006, to Gerald G. Martin, discloses a method and apparatus for generating hydroelectric power, with inlets and outlets in a river. The instant invention is distinguishable, because (1) only it channels the river water through a long pipe before drawing some of it off to do work, (2) it may use equipment other than turbine generators to do work, and (3) only it has a waterfall embodiment.

U.S. Pat. No. 7,150,149, issued on Dec. 19, 2006, to Geoffrey Kenneth Rochester and Keith Pullen, discloses an apparatus for extracting power from a fluid flow, but without the use of pipes or tanks to channel the flow as in the instant invention.

U.S. Pat. No. 7,357,599, issued on Apr. 15, 2008, to Jeffrey L. Cripps, discloses a waste water electrical power generating system, which is not designed for use in rivers or waterfalls as is the instant invention.

U.S. Pat. No. 7,501,712, issued on Mar. 10, 2009, to David Bolyard, discloses a process for using waste water from community sewer systems to generate electrical power, which is not designed for use in rivers or waterfalls as is the instant invention.

U.S. Pat. No. 7,579,703, issued on Aug. 25, 2009, to Joseph Salvatore Shifrin, discloses a hydroelectric in-pipe generator. The present invention is distinguishable, in that in it, the generation of electricity takes place outside the pipe.

U.S. Patent Application Publication No. 2009/0085356, published on Apr. 2, 2009, to Victor Lyatkher, discloses a dam-free hydro-power plant, without the elongated pipes or tanks to channel the flow of water of the instant invention.

West German Patent No. 33 33 716, published on Jan. 17, 1985, to Helmut Sager, discloses a hydroelectric power station, using an artificial water head not required in the instant invention.

Japanese Patent No. 2006-17055, published on Jan. 19, 2006, inventors Masashi Yasuda, Masakazu Kobayashi and Toshiharu Uehara, discloses a hydraulic power generating facility, using a water pipe, but not designed for use in rivers or waterfalls as is the instant invention.

None of the above inventions and patents, taken either singly or in combination, is seen to describe the instant invention as claimed.

SUMMARY OF THE INVENTION

The river high pressure energy conversion machines of the present invention have no moving parts. They use only the force of gravity to generate pressure for doing work. They are installed attached to the river beds adjacent to river banks, or they may be attached to waterfalls.

The first preferred embodiment relates to a mainline machine which may run from river head to river mouth or any distance in between with multiple inlets from other river pumps with multiple turbogenerators both sides of main river and side rivers. Electrical power from the multiple turbogenerators can be manifolded to common power grids. Each power location can have turbogenerator farms manifolded to common power grids. In all cases the water is borrowed to generate electricity and returned directly to the rivers nearby with no effect on river flow or ecology.

The inlet of the basic machine of the second preferred embodiment of the invention will connect to a flexible pipe which will connect to an enlarged inlet opening attached to the underside of a float to keep the inlet opening just below the water surface regardless of the water surface elevation. The float will be supported by a post attached to a foundation on the river bed. The post will be designed to allow for movement of the float up and down with water surface. A pipe or pipes and fittings will be used to have the pump discharge rise to land level adjacent to the river bank and connect to a turbogenerator on a foundation on land for generating electricity. The water intake pipe will include a stop valve to stop flow of water whenever the accessory turbogenerator is shut down for maintenance. Any manufacturer's turbogenerator may be used regardless of required pressure inlet. A pressure regulating valve will be installed between the stop valve and the turbogenerator to set pressure required by manufacturers.

The waterfall machines of the third preferred embodiment of the invention will be large tanks installed in the vertical position with inlets under the top flow of the waterfall and outlets near the bottom of the tanks. The outlets and inlets will connect to the turbogenerator or generators in an arrangement similar to that of the second preferred embodiment. The discharges from multiple pumps in a waterfall can be manifolded together to serve multiple turbogenerators which can be manifolded together to a common power grid.

Water seeks its own level. River water weighs 64 pounds per cubic foot more or less. The pressure exerted on the bottom side of a cubic foot of water will be 64 divided by 144 square inches=0.44444 psi. Assume the turbogenerator requires 100 psi for operation. Divide 100 psi by 0.44444 psi per foot of elevation to get 225 feet, the necessary change in elevation for a pressure of 100 psi at the bottom of the pump. The length of the pump will vary with the slope of the river where installed. The pump can be any length to take advantage of the slope. If the change in elevation is 450 feet, the discharge pressure of the pump will be 200 psi. For an elevation change of 1000 feet, the discharge pressure will be 444.4 psi. The machine length for a given discharge will vary with the slope of the river at the location of the pump. The mainline may begin at any elevated body of water, above waterfalls and dams that discharge into the river, and may be run over or around waterfalls, and over, through or around dams, and continue downstream, creating greater pressure downstream.

Accordingly, it is a principal object of the invention to provide a means for extracting energy from the flow of water in rivers.

It is another object of the invention to provide a means for extracting energy from the flow of water in waterfalls.

It is a further object of the invention to provide a means for extracting energy from the flow of water that does not interfere with the flow of rivers, transportation, or wildlife.

Still another object of the invention is to provide a substitute for polluting sources of energy.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention relates to hydrokinetic energy conversion systems, more particularly river high pressure water pumps that convert river water and gravitational energy to a form of a high pressure water. The machines may be used for various purposes, including generating power, compressing and/or liquefying gaseous fluids, producing potable water or general cleaning thereof, through reverse osmosis membrane processes, irrigation for aquatic farms, delivering water from one location to another, etc. The present invention, the River High Pressure Energy Conversion Machine, is the equivalent of a machine commonly called a pump which has been around for thousands of years. It performs the same functions as any known pumps. Pumps do nothing but increase the pressure on fluids, adding energy for doing work. This machine can do all that any pump other does by using turbines for driving other kinds of pumps and compressors.

Figure 1:
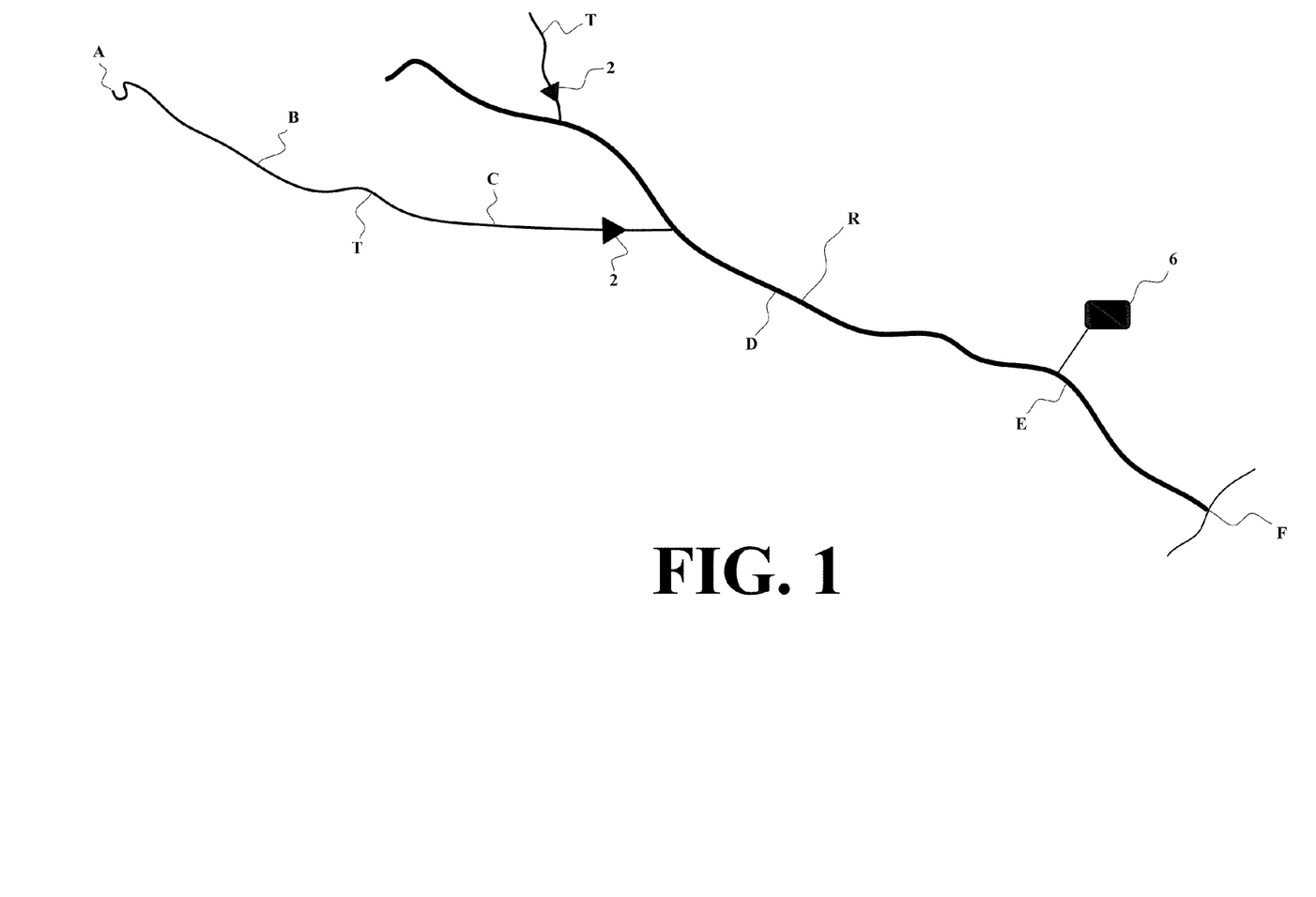
FIG. 1 is a schematic view of the first preferred embodiment of the invention.

The environment of the first preferred embodiment of the invention is illustrated in FIG. 1. The mainline pipe is located in the sloping river R. Feeder river machines are located in tributaries T. Back flow prevention valves 2 prevent water from flowing back into the rivers before it reaches the mainline pipe. A turbogenerator 6 or other water driven accessory is driven by water from the mainline pipe. A one foot tall square inch column of water exerts 0.4444 pounds per square inch at its base, assuming river water weighing 64 pounds per cubic foot. At the headwaters of the river at point A, at an elevation of 1,364 feet, the pressure is zero pounds per square inch. At point B, at an elevation of 909 feet, the pressure is 200 pounds per square inch. At point C, at an elevation of 682 feet, the pressure is 300 pounds per square inch. At point D, at an elevation of 455 feet, the pressure is 400 pounds per square inch. At point E, at an elevation of 227 feet, the pressure is 500 pounds per square inch. At point F, at sea level, the pressure is 600 pounds per square inch. (These figures are purely for illustration, and should not be construed to limit the scope of the invention.)

Figure 2:
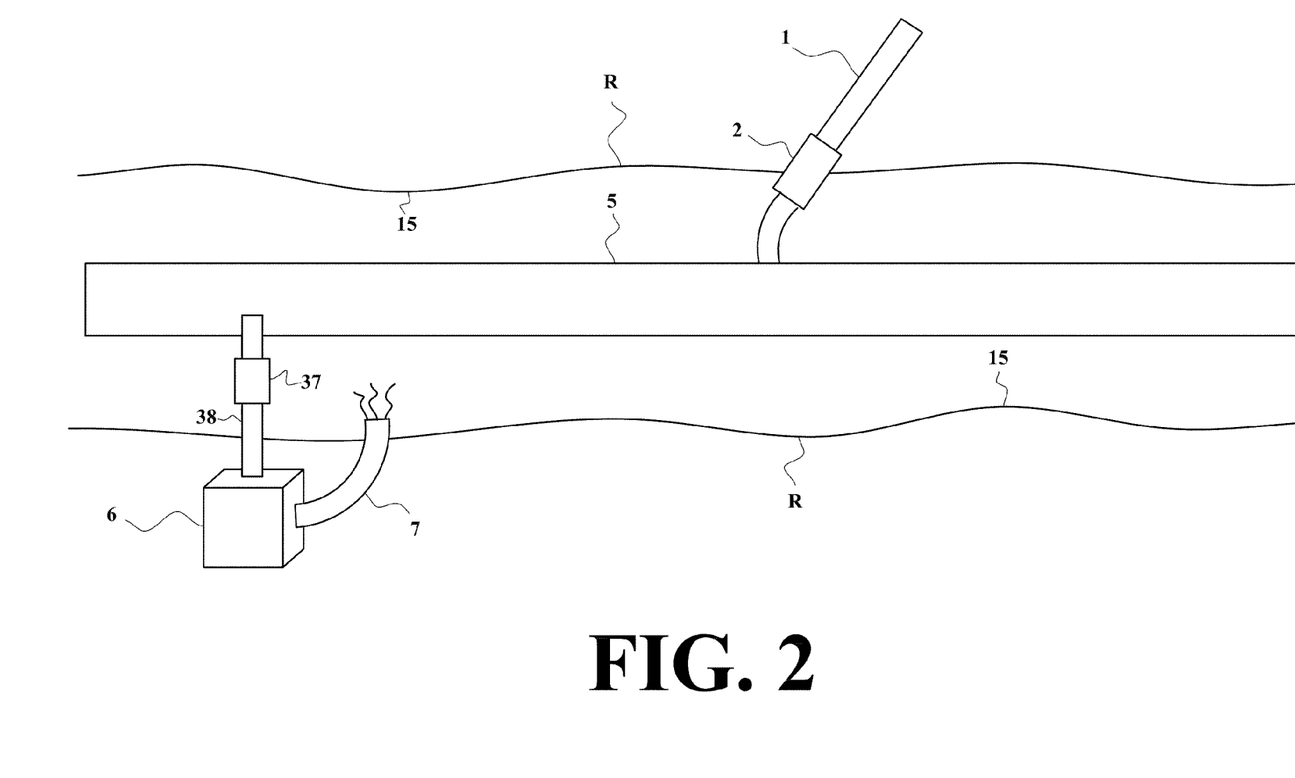
FIG. 2 is a top view of the first preferred embodiment of the invention.

The first preferred embodiment of the invention is illustrated in FIG. 2, showing the river R, land 15, the mainline pipe 5, feeder machine 1 with back flow prevention valve 2, a turbogenerator or other water driven accessory 6, supply line 38 with valve 37, and discharge pipe 7.

Figure 3:
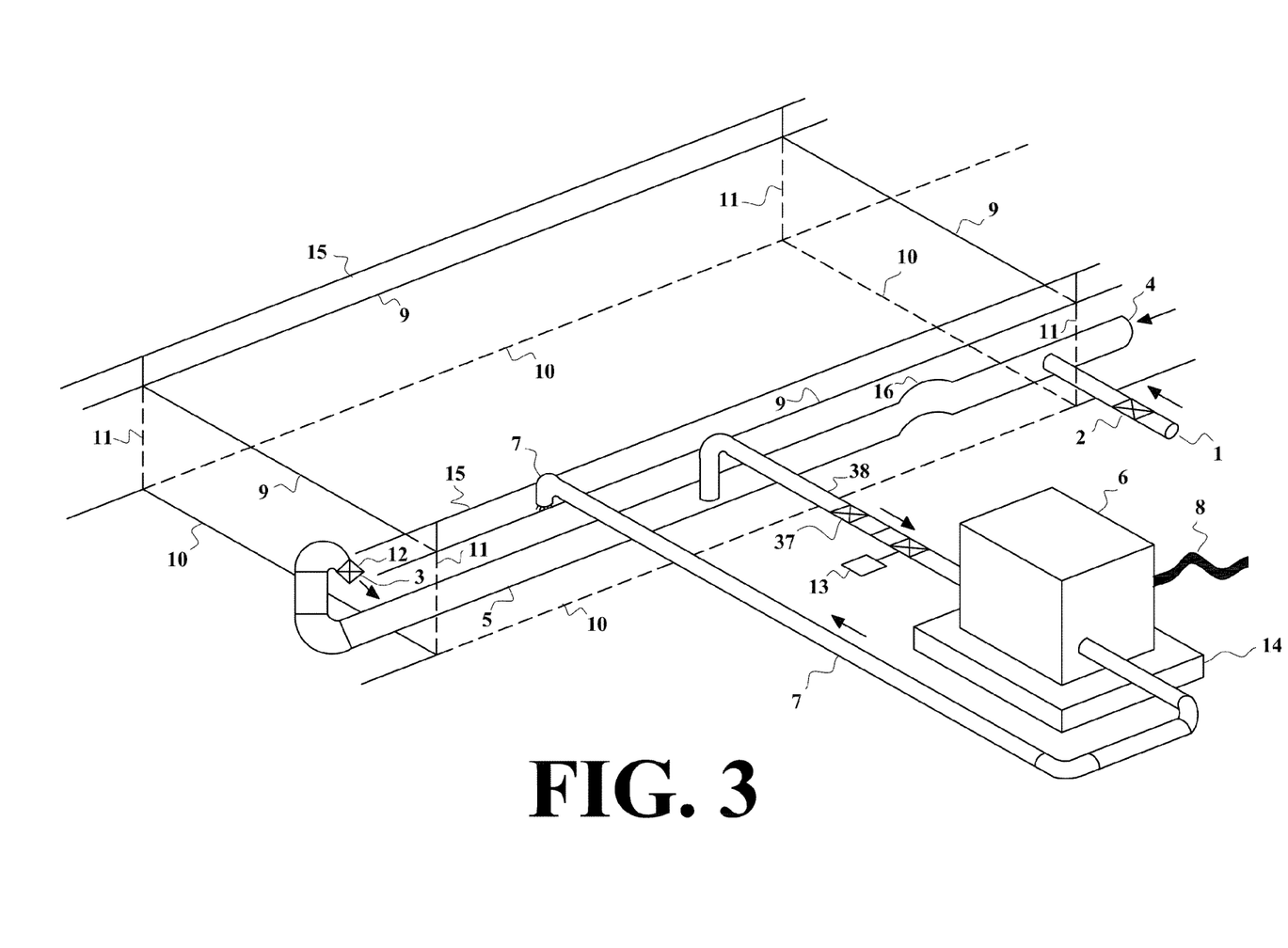
FIG. 3 is a perspective view of the first preferred embodiment of the invention.

The first preferred embodiment of the invention is further illustrated in FIG. 3, showing the river water surface 9, river bed 10, river bank 11, and land 15. The direction of flow is indicated by the arrows. 16 indicates variations in length of pump 5 depending of the river slope.

Referring to FIG. 3, the mainline high pressure water pump 5 with inlet 4 and outlet 3 can be any length from river head to river mouth of the river or rivers with gravitation as the driver. Feeder river water machines 1 may be any length from feeder river heads to discharge into the mainline machine 5. Back flow prevention valves 2 will be installed in feeder river water machine 1 before connection to mainline high pressure water machine 5 to prevent back flow of river water to feeder river water machine 1 with lower head pressures than other feeder river water machine 1 and mainline machine 5.

Whenever the mainline ends, an accessible stop valve 12 shall be installed to control final outflow of river water and pressure. The stop valve should never be fully closed, so that sediment and debris is released from the system. Referring to FIG. 1, the supply pipe 38 from mainline pump 5 to turbogenerator 6 has the stop valve 37 to prevent water flow during maintenance of turbogenerator 6 and a pressure control valve 13 to control the pressure in turbogenerator 6 (to keep it within a safe range, as may be recommend by its manufacturer). The turbogenerator 6 may be installed on a suitable foundation 14 on land near or away from the river bank. A discharge pipe 7 from turbogenerator 6 will allow discharge of water back to the river from where it came. River volume discharged is identical to flow to turbogenerator 6. Heat from the turbogenerator 6 is dissipated to the atmosphere. Provisions are made to connect turbogenerator 6 to a power grid 8.

Figure 4:
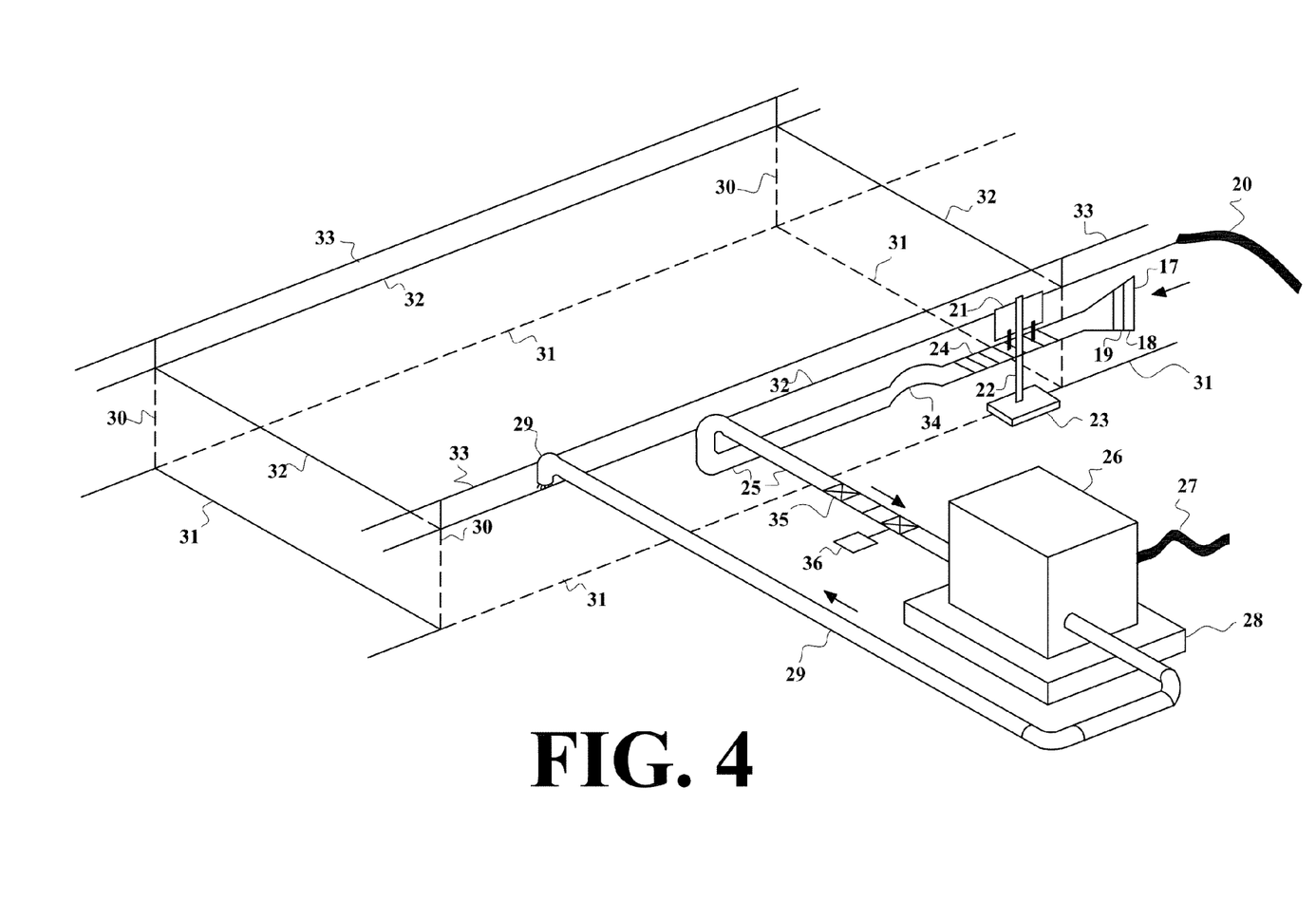
FIG. 4 is a perspective view of the second preferred embodiment of the invention.

Referring to FIG. 4, the water inlet 17 of the basic machine will connect to a flexible pipe 24 which will connect to an enlarged inlet 18 attached to the underside of a float 21 to keep the enlarged inlet 18 just below the water surface regardless of the water surface elevation. Filter 19 is behind the strainer in the inlet 18. Upstream barrier 20 is installed to prevent large floating objects from impinging on inlet apparatus. The float 21 will be supported by a post 22 attached to a foundation 23 on the river bed 31. The post 22 will be designed to allow for movement of the float 21 up and down with water surface 32 movement. A pipe and fittings will be used to have the pump inlet pipe 25 rise onto land 33 level adjacent to the river bank 30 and connect to a turbogenerator 26 on a foundation 28 on land 33 for generating electricity. Water discharge pipe 29 is for water discharge back to the river from turbogenerator 26. The inlet pipe 25 will include a stop valve 35 to stop flow of water whenever the accessory turbogenerator is shut down for maintenance. Electrical cable 27 connects to power grid. Any manufacturer's turbogenerator 26 may be used, regardless of required pressure inlet. A pressure regulating valve 36 will be installed between the stop valve 35 and the turbogenerator 26 to set pressure required by manufacturer. Referring to FIG. 2, the river is described as follows: river water surface 32, river bed 31, river bank 30, and land 33. Arrows indicate the direction of water flow. 34 indicates variations in length of machine 26, depending on the river slope.

Figure 5:
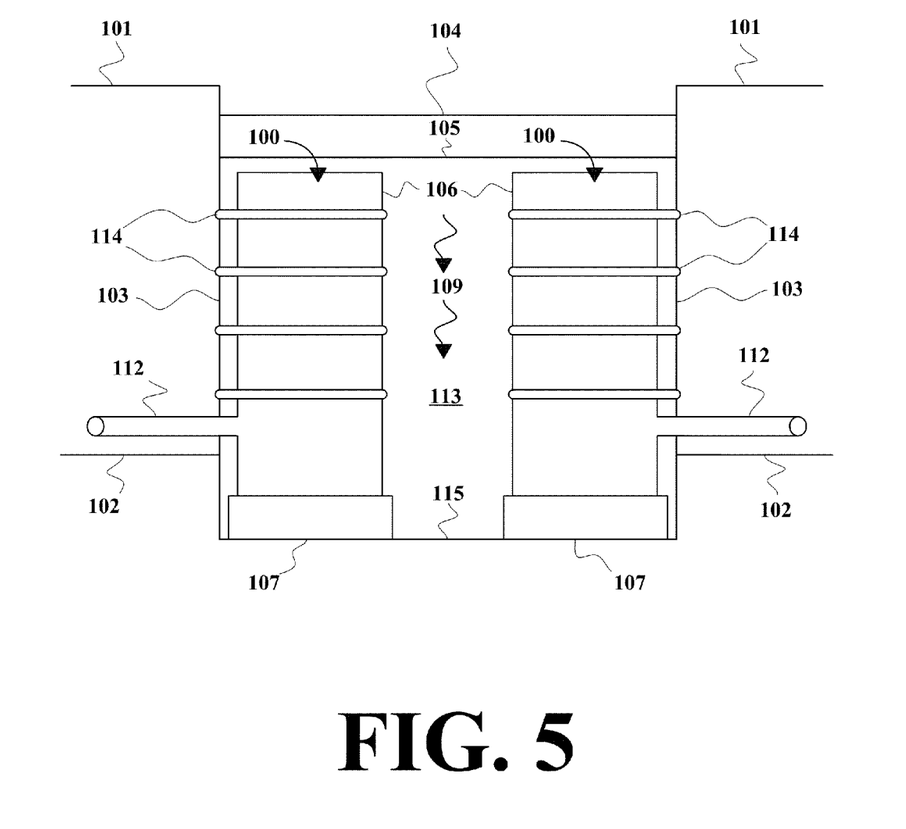
FIG. 5 is a front elevational view of the third preferred embodiment of the invention.
Figure 6:
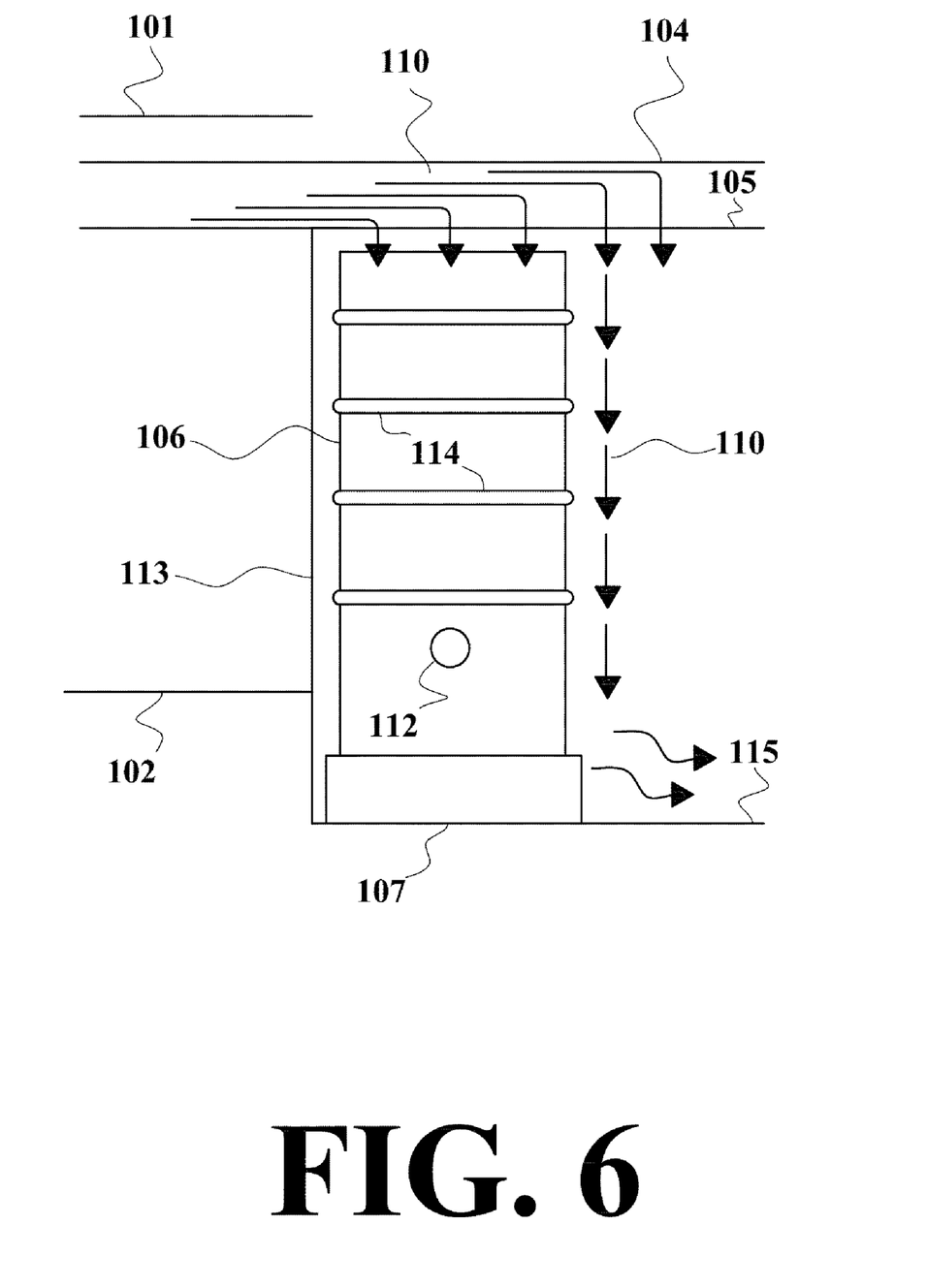
FIG. 6 a left side elevational view of the third preferred embodiment of the invention.

Referring to FIG. 5, Land 101 is near the top of the waterfall. Land 102 is near the bottom of the waterfall. Waterfall edges 103 are near the outer edges of machines 106. Top water surface 104 of the river is just below the land surface 101. The upper river bed surface 105 is just below flowing water 110. River water 110 is filling machines (or tanks) 106, and over flowing down the waterfall and keeping machines 106 full, when turbogenerators (not shown) are borrowing water to generate electricity. Back land wall 113 of waterfall is behind falling water 109. Typical straps 114 attach tanks 106 to land edges 103. The particular method of attachment and support is to be determined by site conditions. Pipe 112 supplies pressurized water to turbogenerator accessories (not shown). Supply and discharge are the same as shown in FIG. 6's pipe 25 intake and pipe 29 discharge. The bases 107 of the machines rest on the river bed 115.

This invention is beneficial to the Department of Energy ("DOE") because it makes it possible to generate electricity and potable water singularly, or simultaneously with other uses, using only gravitational forces as the power source.

The high pressure river machines are river energy inventions which convert gravitational forces to mechanical forces for doing work. The primary resource is river water stored from high elevations to low elevations inside the machine, which causes water pressure to be high near the bottom of the machine. The basic machine will deliver high pressure river water to turbines, turbogenerators, mechanical equipment and other on land to do work. Pressurized river water will be generated do work 24 hours every day for as long as the equipment is operable and rivers flow. Unlike any other forms of renewable energy, it is exactly suitable for base load power applications.

The high pressure river machines can be used with any water pump driven by turbines to pump or compress any fluid, liquid or gaseous and deliver liquid and gases from one location to another for storage and doing work.

The high pressure river machines meet DOE's mission for reducing our dependence on fossil, nuclear and other manufactured fuels. The only costs are design, installation and maintenance. The success of this device does not depend on developing any new enabling technology. It is ready to go. Gravity is the only force that makes the pump workable.

The river pressurized water pump can be used: to drive turbines generating electricity; force water through reverse osmosis units generate potable water (drinking water); drive mechanical machinery directly; provide nutrient rich water to fish farms; or provide water for irrigation, swimming, manufacturing, etc.

Scientifically the present invention works as follows: For the sake of argument, river water weighs 64 pounds a cubic foot, more or less, depending how much of miscellaneous elements are dissolved in it. All rivers flow mostly downhill, sloping more or less or not at all in sections from head to foot. Elevation is the measure of distance above sea level. Water seeks it own level. Water weighing 64 pounds per cubic foot divided by 144 square inches=0.44444 psi per foot of elevation drop.

For an elevation drop necessary to have 100 psi pressure available inside the sloping pipe near bottom to drive a turbine to generate electricity divide 100 psi by 0.44444 psi per foot and get 225 feet with a 45 degree slope. The length of the machine pipe will be 225 square×225 square=square root of 101,250=318 feet. The length of the machines vary with the slope.

Waterfalls are vertical and have no slope. Their length is the usable height of the waterfall. Thirty five waterfalls in the world exceed 2000 feet in height. Using the waterfall high pressure water pump, the water pressure at the bottom=2000 feet times 0.44444=888.9 psi. Immense work can be done with that pressure, with absolutely zero effect on river flow and environment.

The Missouri River is the longest river in the USA. Its elevation drop from head to mouth is 4042 feet at its head minus 404 feet at the Mississippi River=3638 feet×0.44444 psi per foot=1617 psi. Many machines can be installed on both sides of the river, with no effect on river flow and ever increasing work outputs at each location. There can be pump farms at each location with one water supply manifolding water to multiple turbines, with power manifolded together to power grids. Pressure regulating valves can be installed in pipes to individual turbines to regulate pressure, allowing use of any pressure required by manufacturer's turbines or turbogenerators to do work intended.

Imagine mainline machine pipes as long as the Missouri river or as long as the Missouri-Mississippi, having greater water pressure reusing water already used above. Water can be entered into the Missouri-Mississippi from both sides of the rivers, each having a mainline connecting to the Missouri-Mississippi mainline.

Back flow prevention valves will have to be installed in branch mainlines which have lower head elevations than the highest to avoid backup and overflow to those heads. Back flow could be allowed to fill reservoirs at high elevations (lower than the highest elevation) for use in peak periods of demand.

Imagine the Dungeness River in Washington State with an elevation drop of 7300 feet in 32 miles—the steepest river in the U.S.A. The only limiting factor will be available volume which may decrease during dry or freezing weather. Power may then be available from a power grid from other rivers.

A principal advantage of the present invention is that it will have zero effect on river flow, environment, ecology, and wildlife in rivers and on land. The present invention will not effect the flow rivers when generating electricity. Water is in and out of the turbogenerators at approximately the same location without change in river flow. The present invention will not interfere with river transportation.

Imagine river high pressure energy conversion machines on all of the major rivers in the world that have adequate elevation drops and flows. Imagine large power grids to distribute the power where needed. All of that with zero downside. There will be no need to use fossil and nuclear fuels again anywhere.

Imagine machines installed vertically on waterfalls with inlet funnels at top to collect water into the machines, creating high water pressure near the bottom of the machines. There are 35 waterfalls in the world with elevations varying from 2200 feet to 3212 feet. The pressure at bottom of a 2200 foot waterfall will be 2200×0.44444=978 psi. The Pressure at the bottom of the 3212 foot waterfall will be 3212×0.44444=1427 psi. Every 225 feet of elevation on waterfalls add 100 psi to the total pressure at bottom of the falls. Pipe water to turbogenerator units on land to produce electricity. Discharge the river water back into the river. The result is zero change in water volume downstream from the waterfalls. Machines can be made as wide as the falls, with a large percentage of the water overflowing the pumps without being used. A list of the world's largest waterfalls can be found at http://www.world-waterfalls.com.

The high pressure water can be borrowed to drive turbogenerators located away from the waterfalls, and water can be returned to the river nearby or anywhere down stream.

What about the ownership of river water? River water itself may be allocated by water courts to various users such as farmers and city utility companies that divert the water from the river. But the higher courts have ruled that public ownership and the pubic trust doctrine must also be considered in water use regulation. Courts have specifically rejected the argument that public trust values on rivers were "subsumed" into water rights allocations. Courts have held that the public trust doctrine applies to natural water resources, regardless of their navigability. (Flowing water is a public resource in any case.) The public trust extends even to very small streams. (See www.nationalrivers.org/us-law-who-owns.htm.)

The inventor has met with the Corps of Engineers in Little Rock, Ark., and discussed rules and regulations for using river waters, river beds and river banks for his project. He will have no problem conforming with Federal regulations and rules. Permits will be required. I also will have to comply with individual state rules and regulations. Permits will be required. Each state where a state line is crossed will have to approve the crossings by his pump. Each state will have to approve anything he installs in the rivers, or on the river beds and banks. No individual, state or corporation owns any of the water, as it is owned by all of the people.

It is to be understood that the present invention is not limited to the embodiment described above, but encompasses any and all embodiments within the scope of the following claims.

I claim:

1. A gravity powered above-ground river high pressure energy conversion machine, comprising:
    a mainline pipe running longitudinally down the river;
    an inlet to the mainline pipe to allow water to fill the pipe at an upriver origination point of the mainline pipe;
    one or more accessory supply pipes, each having a first end connected to the mainline pipe and a second end terminating above land;
    stop valves and pressure regulating valves in the accessory supply pipes;
    provisions at the second ends of the accessory supply pipes for connection to above ground water driven accessories;
    discharge pipes, each having a water-tight connection on a first end to one of the above ground water driven accessories and an opposite second end through which water from the accessories can be discharged back into the river;
    feeder river machines that collect water and discharge it into the mainline pipe; and backflow prevention valves in the feeder river machines; wherein the accessory supply pipes and discharge pipes are located throughout the extents of the main pipeline.

2. The gravity powered above-ground river high pressure energy conversion machine according to claim 1:
    wherein the above ground water driven accessories are turbogenerators.

3. The gravity powered above-ground river high pressure energy conversion machine according to claim 1:
    wherein the provisions at the second ends of the accessory supply pipes for connection to above ground water driven accessories are flanges.

4. The gravity powered above-ground river high pressure energy conversion machine according to claim 1:
    wherein the water-tight connections on the first ends of the discharge pipes include flanges.

5. The gravity powered above-ground river high pressure energy conversion machine according to claim 1, wherein:
    the accessory supply pipes are formed from rigid sections having orientations selected from the group comprising vertical, horizontal, diagonal and curved, and attached to extend from the mainland pipe to the above ground water driven accessories.

6. The gravity powered above-ground river high pressure energy conversion machine according to claim 1, wherein:
    the above ground water driven accessories are manifolded together and mounted on one or more foundations.

7. The gravity powered above-ground river high pressure energy conversion machine according to claim 1, wherein:
    the discharge pipes are formed from rigid sections having orientations selected from the group comprising vertical, horizontal, diagonal and curved, and attached to extend from the above ground water driven accessories to the river where the water from the accessories is discharged.

8. The gravity powered above-ground river high pressure energy conversion machine according to claim 1, wherein:
    the accessory supply pipes and the discharge pipes are flexible.

9. The gravity powered above-ground river high pressure energy conversion machine according to claim 1, wherein:
   the accessory supply pipes and the discharge pipes are made up of a combination of rigid and flexible components.

10. The gravity powered above-ground river high pressure energy conversion machine according to claim 1, wherein:
   an opening is provided in the downstream end of the mainline pipe to allow discharge of debris.

11. The river high pressure energy conversion machine according to claim 1, further comprising:
   a single inlet funnel in the inlet to the mainline pipe, having an enlarged end for receiving water from a flowing river and an opposite small end, with the funnel orientated so that its enlarged end directly faces the incoming current;
   a flexible pipe connected to the small end of the inlet funnel;
   a float riding on a surface of the flowing river, with the flexible pipe attached to the underside of the float, so that the pipe holds a top of the enlarged end of the inlet funnel below the river surface;
   wherein the flow of the river is unobstructed between the location of the inlet funnel and the location of the second end of the discharge pipe.

12. The river high pressure energy conversion machine according to claim 11, further comprising:
   a strainer and a filter on the enlarged end of the inlet funnel.

13. The river high pressure energy conversion machine according to claim 11, further comprising:
   a post attached to a foundation on the river bed, with the float being attached in a slot of the post, allowing the inlet funnel to slide up and down when the river surface rises or falls.

14. The river high pressure energy conversion machine according to claim 11, wherein:
   the above ground water driven accessories are turbogenerators manifolded together and mounted on a foundation.

15. The river high pressure energy conversion machine according to claim 11, wherein:
   the second end of the discharge pipe drops vertically to several inches above the normal high water level of the river surface.

* * * * *